Feb. 19, 1946.　　　E. D. HANSON　　　2,395,047
VARIABLE TORQUE DRIVE
Filed May 11, 1942　　　5 Sheets-Sheet 5

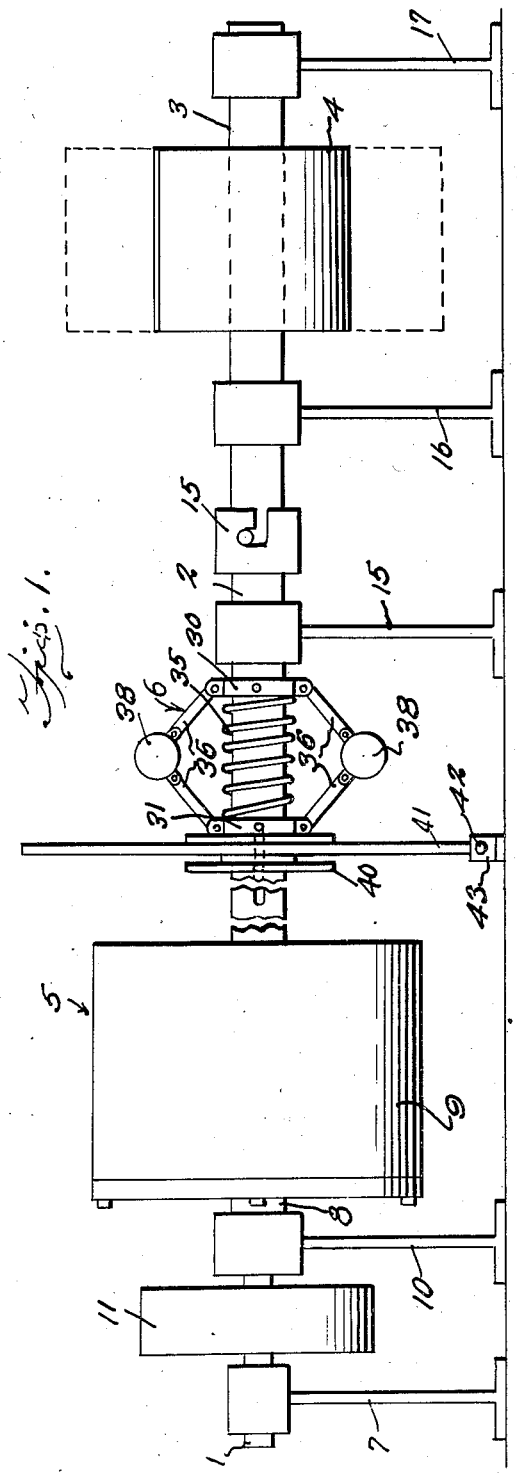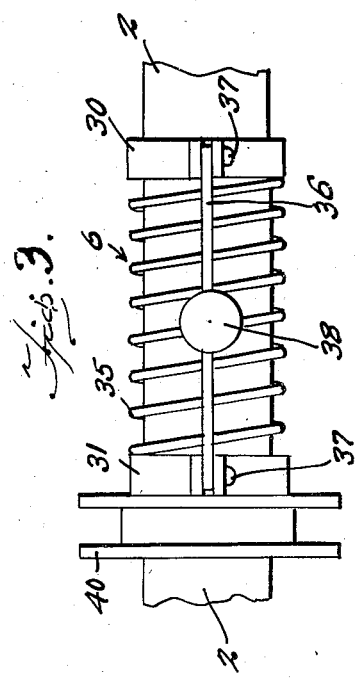

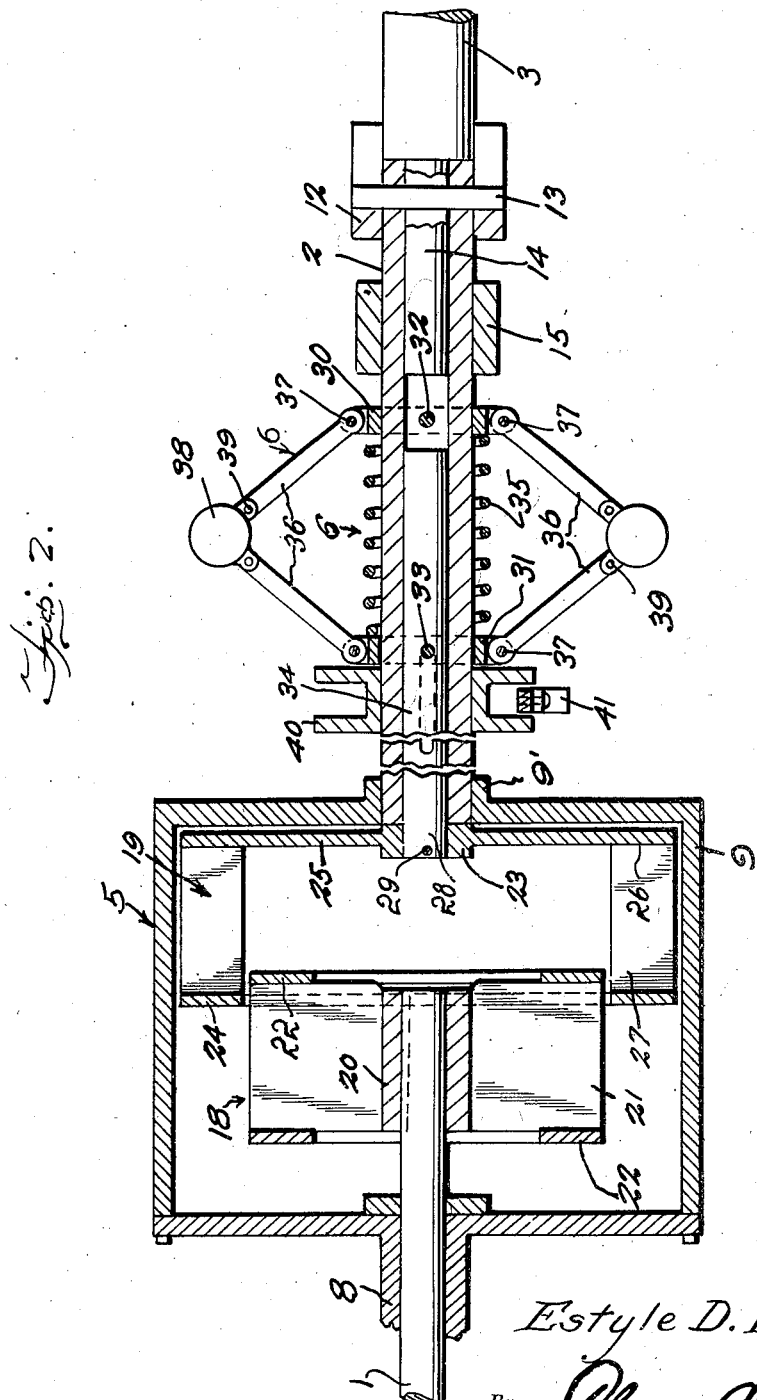

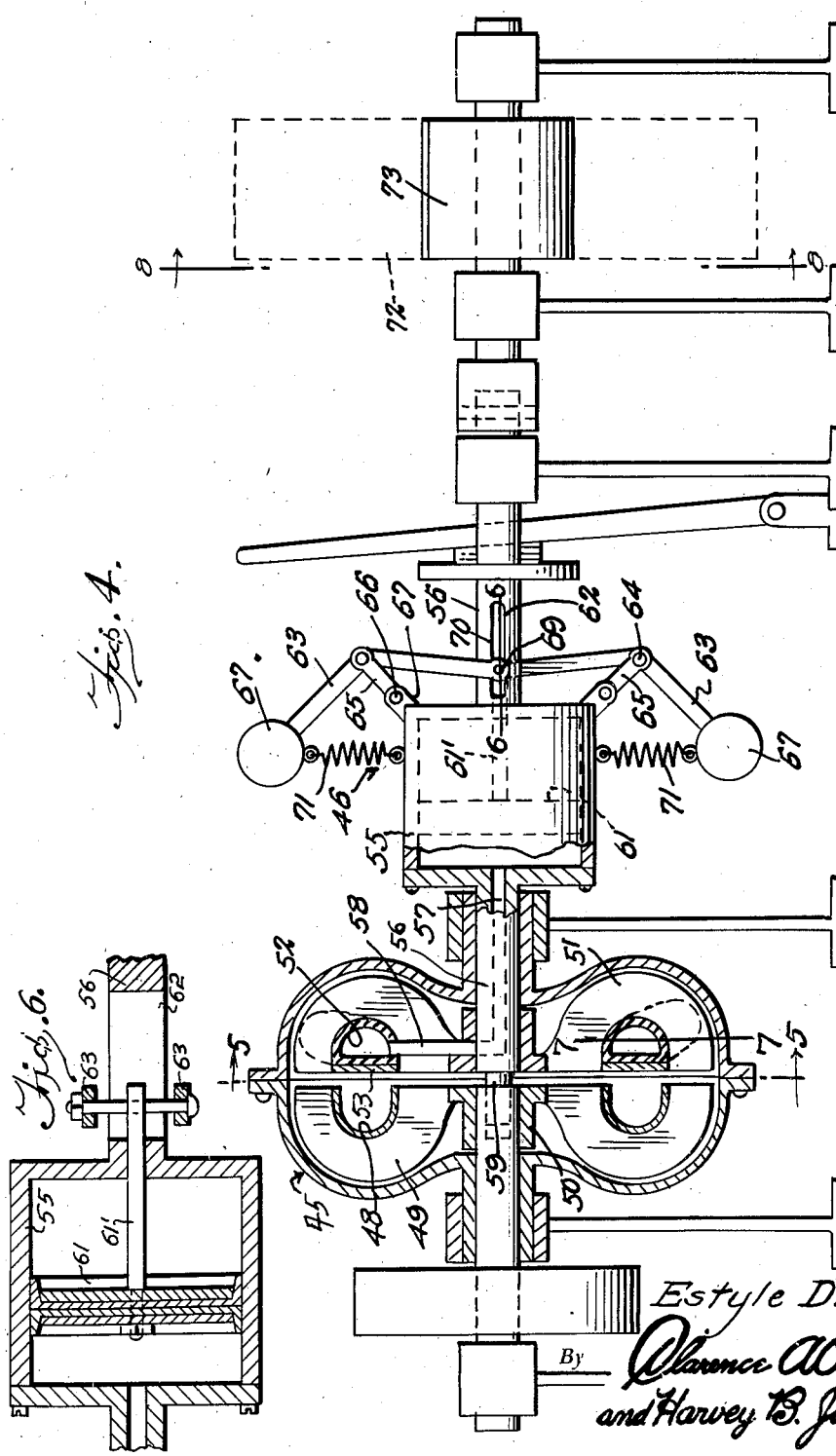

Inventor
Estyle D. Hanson
By Clarence A. O'Brien
and Harvey B. Jacobson, Attorneys Patented Feb. 19, 1946

2,395,047

UNITED STATES PATENT OFFICE 2,395,047

VARIABLE TORQUE DRIVE

Estyle D. Hanson, Hamilton, Ohio

Application May 11, 1942, Serial No. 442,553

2 Claims. (Cl. 60—54)

My invention relates to improvements in variable torque drives for reels such as are used in winding, or reeling, up paper, cloth, wire, rope and like material under tension.

The invention is designed with the principal object in view of providing a power drive automatically variable in operation as the diameter of the roll being wound increases to maintain a uniform tension at all times on the material being wound.

Other and subordinate objects are also comprehended by my invention, all of which, together with the precise nature of my improvements, will be readily understood when the succeeding description and claims are read with reference to the drawings accompanying and forming part of this specification.

Figure 5:
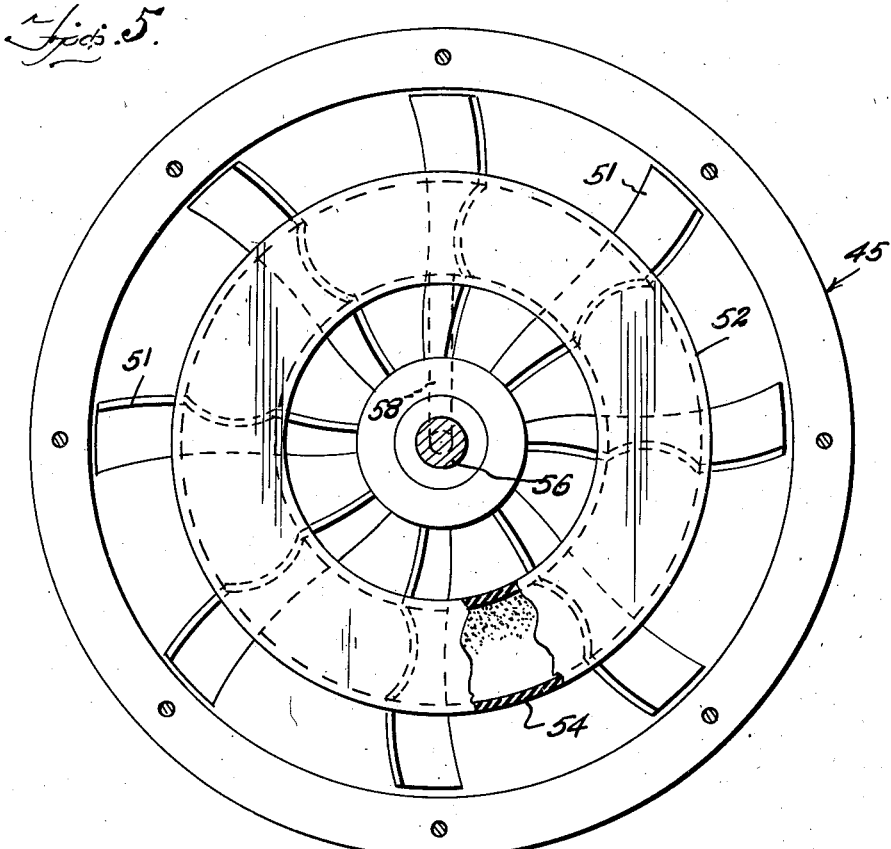
Figure 7:
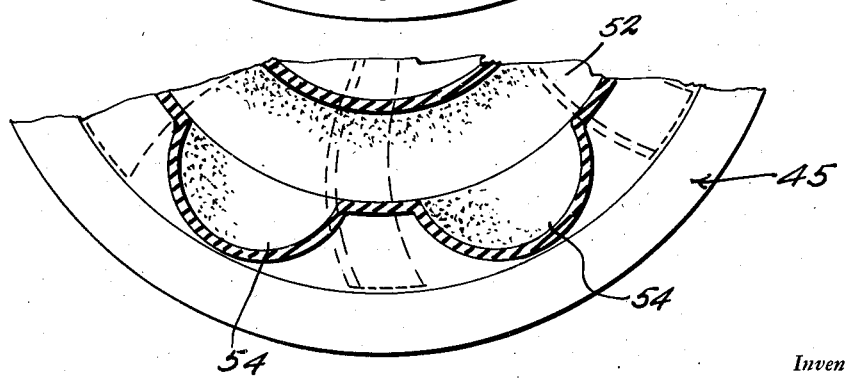
Figure 8:
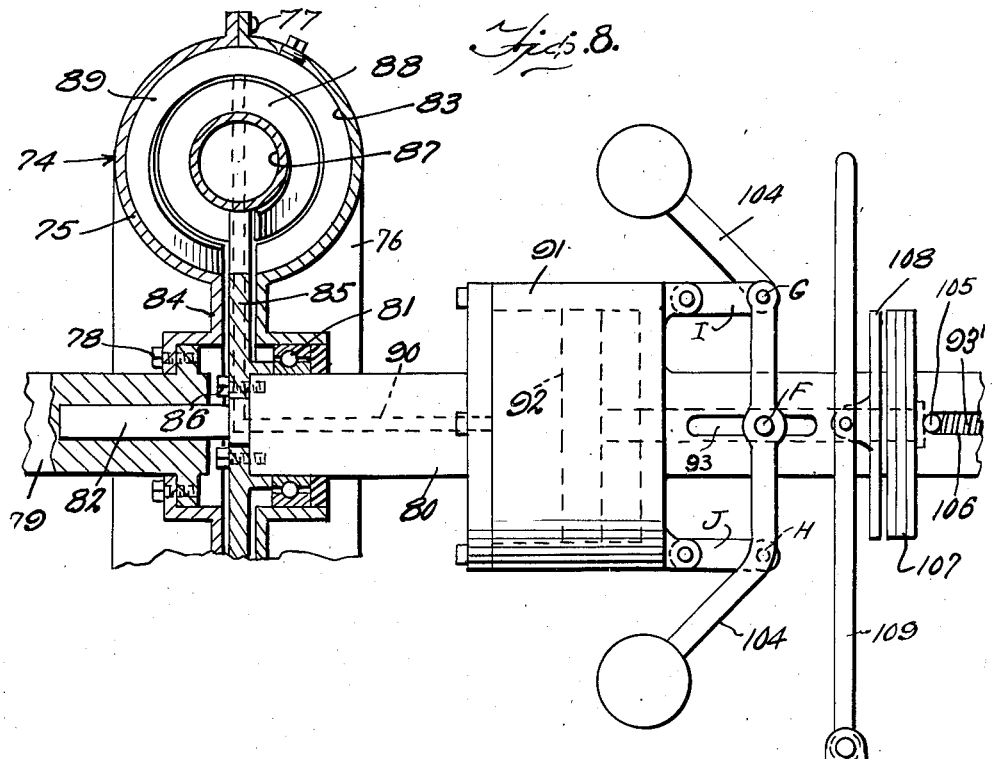
Figure 9:
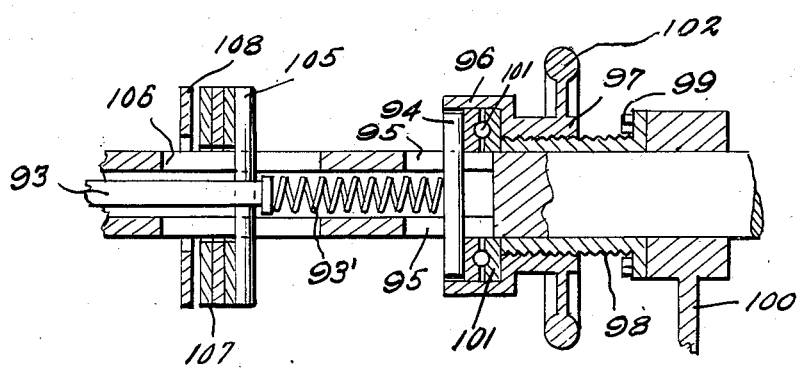

In said drawings:

Figure 1 is a view in side elevation of my improved variable torque drive in its preferred embodiment, Figure 2 is a fragmentary view in longitudinal section drawn to an enlarged scale, Figure 3 is a fragmentary view in plan of the clutch control unit, Figure 4 is a view similar to Figure 1, with parts shown in section, and illustrating a modified form of the invention, Figure 5 is a view in transverse section taken on the line 5—5 of Figure 4 and drawn to an enlarged scale, Figure 6 is a view in horizontal section taken on the line 6—6 of Figure 4 and drawn to an enlarged scale, Figure 7 is a fragmentary view in vertical section taken on the line 7—7 of Figure 4, Figure 8 is a fragmentary view partly in side elevation and partly in transverse section of another modified form of the invention, and Figure 9 is a similar view of a part of the modified form of the invention shown in part in Figure 8.

Referring to the drawings by numerals, and first to Figures 1, 2, and 3, my improved drive in its preferred embodiment comprises, as its basic elements, a drive shaft 1, a hollow driven shaft 2, a reel shaft 3, having a reel 4 fast thereon, a fluid torque transmitting clutch 5, and a governor operated clutch control unit 6, the shafts 1, 2, 3 being horizontally aligned.

The drive shaft 1 is journaled at one end in a bearing bracket 7 with its other end journaled in an axial bearing sleeve 8 provided on one side of the cylindrical clutch casing 9 into which said other end of the drive shaft extends, said sleeve 8 being suitably fixed in a bearing bracket 10 whereby the casing is held against rotation. A belt pulley 11 is fast on the drive shaft 1 between the bearing brackets 7 and 10.

The driven shaft 2 is journaled at one end in an axial hub 9' on the other side of the clutch casing 9 and is coupled at its other end by a suitable slotted sleeve 12 and diametrical pin 13 to a reduced end 14 on the reel shaft 3 fitted in the driven shaft 2. The driven shaft 2 is journaled adjacent its other end in a bearing bracket 15.

The reel shaft 3 is journaled adjacent opposite ends thereof in a pair of bearing brackets 16, 17 with the reel 4 suitably fixed thereon intermediate said brackets.

Within the clutch casing 9 is a pair of rotary, axially aligned, impeller and runner units 18, 19 of circular form, the impeller unit 18 comprising a hub sleeve 20 fast on that end of the driving shaft 1 extending into the clutch casing 9, radial vanes 21 extending from said sleeve, and a pair of annular side members 22 connecting said vanes adjacent the outer ends thereof. The runner unit 19 comprises a hub 23, a spider including radial arms 25 extending from the hub and carrying an annular side member 26 on one side of the unit, radial vanes 27 extending from said member 26 laterally toward the impeller unit 18, and an annular side member 24 connecting the vanes 27 on the other side of the unit, said member 24 and vanes being constructed and arranged to permit the same to be moved over the impeller unit 18 laterally.

The clutch control means comprises a short shaft 28 slidably mounted in the driven shaft 2 to extend at one end into the clutch casing 9 and to which end the hub 23 of the runner unit 19 is fixed by a pin 29, said shaft 28 being endwise movable in the driven shaft 2 toward and from the impeller unit 18 to correspondingly move the runner unit 19. A centrifugal throw governor is provided on the driven shaft 2 comprising a pair of laterally spaced fixed and movable collars 30, 31. A pin 32 extending through the fixed collar 30 and through the driven shaft 2 secures the collar to said shaft. A similar pin 33 extends through the movable collar 31 by way of longitudinal slots 34 in the driven shaft 2, whereby said collar 31 is slidable on said shaft 2 and connected to the shaft 28 to move the latter endwise. A coil spring 35 on said driven shaft 2 and interposed between said collars 30, 31 acts to advance the collar 31 toward the clutch casing 9, and hence the shaft 28 and runner unit 19 toward the impeller unit 18.

Ball carrying links 36 pivotally connected, as at 37, to said collars 30, 31 in pairs on opposite sides of the driven shaft 2, and similarly connected to the balls 38, as at 39, act under centrifugal throw of said balls to retract the collar 31 and the shaft 28 together with the runner unit 19 to the right to an extreme position shown in Fig. 2, wherein hub 23 engages the adjacent side of casing 9. In this position, only a small axial portion of the runner vanes 27 surrounds impeller vanes 21, thereby serving to prevent further increase in the speed of the runner. As the runner slow down, governor balls 38 slide the runner to the left, thereby exposing more of each of runner blades 27 to the liquid pumped by impeller vanes 21 and tending to increase the runner speed.

A sliding, peripherally grooved brake collar 40 is suitably mounted on the driven shaft 2 for frictional engagement by a brake lever 41 pivoted, as at 42, to a fixed bracket 43, said lever and collar serving as means for stopping rotation of the driven shaft 2 at will, for instance, when it is desired to remove a roll from the reel 4 and start another winding operation. The collar 40 may be slid against the collar 31 to retract the shaft 28, in opposition to the spring 35, and thereby retract the runner unit 19 into the described limit of retracting movement thereof to stop the driven shaft 2.

Referring now to the operation of the described embodiment of the invention, it being understood that the clutch casing 9 is filled with heavy fluid, such as oil, under uniform speed of the drive shaft 1, the impeller unit 18 causes the oil to be impelled around the clutch casing 9, in the usual manner, so that when the blades 27 of the runner unit 19 are positioned around the impeller blades 21, the runner unit 19 is caused to rotate, due to the action of the impelled liquid on the runner blades 27, and to thereby impart driving torque to the driven shaft 2 to rotate the reel shaft 3 and reel 4. As the runner unit 19 picks up speed, the described governor moves the runner unit 19 to the right, as viewed in Figure 2, to reduce the axial extent of the runner blades 27 exposed to the action of the impelled liquid, thereby tending to hold the runner speed and that of the driven shaft 2 and said reel 4 constant. As the diameter of the roll being wound increases, the resistance, or in other words, the load on the driven shaft 2 increases, and tends to slow down the driven shaft 2 whereupon the spring 35 tends to advance the sliding collar 31 and shaft 28, and thereby advance the runner unit 19 toward the impeller unit 18 to increase the axial extent of the runner blades 27 exposed to the action of the impelled liquid to thereby increase the driving torque in proportion to the increased power required to overcome the increasing load on the driven shaft 2. Thus, the tension on the material being wound is maintained uniform throughout the winding operation.

In the modified form of the invention shown in Figures 4, 5, 6, 7, the fluid torque transmitting clutch 45 and the clutch control mechanism therefor are constructed and arranged as follows: The impeller comprises an annular, rigid core 48 of substantially semi-circular form in cross-section with an open side facing the runner and spaced vanes 49 radiating from the hub 50 and substantially U-shaped to curve part way around the outer side of the core 48 with inner edges flush with the open side of said core. The runner comprises similar vanes 51 curving oppositely, relative to vanes 49, about a hollow core 52 similar to core 48 but closed and of expansible material such as rubber. An annular reinforcing member 53 facing the core 48 prevents the core 52 from expanding toward the core 48. Between the vanes 51, the core 52 is provided with peripheral pocket forming portions 54 adapted under fluid pressure in said core to be distended outwardly as shown in Figure 7. The clutch casing is of hourglass form transversely to conform to the edge curvature of the vanes 49, 51. The control means comprises a fluid pressure cylinder 55 interposed in the driven shaft 56 and forming an integral part thereof. A fluid conveying duct 57 extends from one end of said cylinder axially through the driven shaft 56. A fluid conveying tube 58 extends from said shaft into the core 52 with its inner end open to the duct 57. The driven shaft 56 has a reduced end 59 journaled in the driving shaft 60. A piston 61 is provided in the cylinder 55 with a piston rod 61' slidable out of the other end of the cylinder into a bore 62 in the driven shaft 56. A pair of ball carrying governor arms 63 extending oppositely from said shaft 56 at opposite sides thereof are pivoted, as at 64, intermediate their ends to links 65 pivoted, as at 66, to ears 67 on said other end of the cylinder at opposite sides of the latter, said arms having centrifugal throw balls 67 fast on their outer ends, the inner ends of said arms 63 being pivoted, as at 69, to opposite sides of the piston rod 61' and the pivot 69 slidably extending through a longitudinal slot 70 provided in said driven shaft 56. A pair of coil springs 71 suitably attached to the governor balls 67 and to the cylinder 55 tension said balls and the governor arms 63 against outward throw.

In the operation of the described modified form of the invention, the springs 71 normally act to swing the outer ends of the governor arms 63 inwardly and said arms thereby act to retract the piston rod 61' and piston 61 away from the duct end of the cylinder 55 so that the core 52 is normally deflated. The fluid in the clutch casing is permitted to flow freely between the vanes 49, 51 permitting increase in driving torque to be transmitted. Hence, as the speed of the driven shaft 56 increases, the governor balls 71 and arms 63 advance the piston 61 to force fluid, air or gas from the cylinder 55 into the core 52 inflating the pocket forming portions 54 into protuberances which obstruct the flow of fluid through said vanes 49, 51 thereby reducing the driving toque transmitted in a manner which will be clear. Obviously, the reverse occurs as the winding 72 builds up on the reel 73 and the driven shaft 56 is slowed down.

In the modified form of the invention shown in Figures 8 and 9, the clutch casing 74 comprises complemental sections 75, 76 bolted together, as at 77, one section 75 being bolted, as at 78, to the driving shaft 79, whereas, the other section 76 rotates about the driven shaft 80 on an antifriction bearing 81. The driven shaft 80 has a reduced end 82 journaled in one end of the drive shaft 79. The sections 75, 76 form a circular circumferential fluid chamber 83 with a hollow intermediate web 84. A disk 85 surrounds the shaft end 82 in the hollow web 84 and is bolted to the driven shaft 80, as at 86, said disk carrying in the chamber 83 an annular core 87 forming part of the runner unit, the other part of which is a split spiral vane 88 surrounding the core and straddling said disk 85. The casing section 75 carries a similar larger spiral vane 89 surrounding the vane 88. A channel 90 leads from a fluid pressure cylinder 91, similar to cylinder 55, through driven shaft 80 and disk 85 through core 87. A piston 92 in cylinder 91 is operative by a governor to be advanced and retracted in the same manner as described with reference to the piston 61, but, to force fluid, such as oil, into the chamber 83 and withdraw such fluid therefrom to increase or diminish the supply and thereby vary the torque transmitted from the impeller, formed by the casing section 75 and vane 89, to the runner formed by the vane 88, core 87 and disk 85.

Referring now to Figure 9, the piston rod 93 of piston 92 is normally advanced by a coil spring 93', which, together with said rod, are housed in the hollow driven shaft 80 one end of said spring being suitably connected to one end of the piston rod 93, whereas, its other end is connected to a variable tensioning device comprising a transverse pin 94 extending through slots 95 in said driven shaft with its ends disposed in the enlarged end 96 of a sleeve 97 threaded onto a fixed sleeve 98 bolted, as at 99, to a shaft bearing 100. An anti-friction unit 101 is provided in said end 96 of the sleeve 97 and to one race member of which the pin 95 is suitably secured so that it may revolve with the shaft 80 in the end 96 of said sleeve 97. Obviously, by turning the sleeve 97 on the sleeve 98, as through the medium of a hand wheel 102 on said sleeve 97, the force exerted by the spring 93' on the rod 93 may be varied. Ball carrying governor arms 104 similar to arms 63 act to retract the piston rod 93 and piston 92. As viewed in Fig. 8, upper arm 104 is pivoted at H to a link J and at F to the piston rod 93. The lower arm 104 is pivoted at F to the piston rod and at G to a link I. A pin 105 extends through the piston rod 93 and through slots 106 in the driven shaft 80. Brake disks 107 sleeved onto the shaft 80 in advance of said pin 105 are urged forwardly under advance of the piston rod 93, by the spring 93', to oppose a brake disk 108 sleeved on the driven rod 80 for operation against said disks 107 by suitable brake lever 109 similar to lever 15.

The foregoing will, it is believed, suffice to impart a clear understanding of my invention without further explanation.

Manifestly, the invention, as described, is susceptible of modification in other respects than as herein set forth, and right is reserved to all modifications falling within the scope of the subjoined claims.

What I claim is:

1. In combination, a pair of driving and driven shafts, respectively, rotatably mounted in end-to-end contiguous axial relation, a reel to which the driven shaft is operatively connected, a fluid clutch for transmitting driving torque from the driving to the driven shaft comprising a clutch casing surrounding the contiguous ends of said shafts, an impeller fast on the driving shaft in said casing, a runner fast on the driven shaft in the casing alongside the impeller and comprising an inflatable core, and means to inflate said core responsive to high speed operation of the driven shaft.

2. In combination, a pair of driving and driven shafts, respectively, rotatably mounted in end-to-end contiguous axial relation, a reel to which the driven shaft is operatively connected, a fluid clutch for transmitting driving torque from the driving to the driven shaft comprising a clutch casing surrounding the contiguous ends of said shafts an impeller fast on the driving shaft in said casing, a runner fast on the driven shaft in the casing alongside the impeller and comprising an inflatable core, and means to inflate said core under high speed operation of the driven shaft, comprising a fluid pressure cylinder interposed in said driven shaft, a piston in said cylinder, and a centrifugal throw governor rotated by said driven shaft and operatively connected to said piston.

ESTYLE D. HANSON.